L. C. IRVIN.
FRUIT PICKER.
APPLICATION FILED DEC. 10, 1912.
1,087,294.
Patented Feb. 17, 1914.
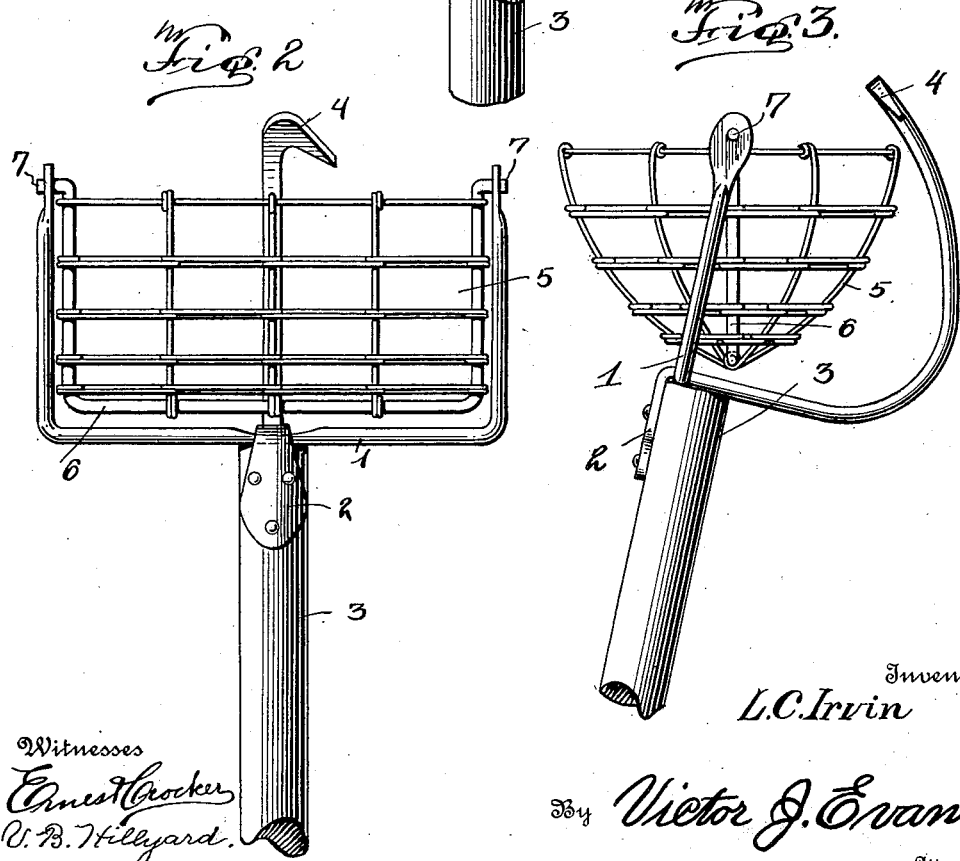
Witnesses
Ernest Crocker
U. B. Hillyard
Inventor
L. C. Irvin
By Victor J. Evans
Attorney

UNITED STATES PATENT OFFICE.

LUTHER C. IRVIN, OF HARTER, WEST VIRGINIA, ASSIGNOR OF ONE-HALF TO ALVIN M. HARTER, OF HARTER, WEST VIRGINIA.

FRUIT-PICKER.

1,087,294.  Specification of Letters Patent.  Patented Feb. 17, 1914.

Application filed December 10, 1912. Serial No. 736,000.

*To all whom it may concern:*

Be it known that I, LUTHER C. IRVIN, a citizen of the United States, residing at Harter, in the county of Pocahontas and State of West Virginia, have invented new and useful Improvements in Fruit-Pickers, of which the following is a specification.

The invention provides an implement which admits of the gathering of fruit without losing or otherwise injuring the same, the device being of such construction as to enable its manipulation by one hand and which in operation will exert a stripping of the fruit from the limb by a longitudinal movement or straight pull.

The invention consists of a frame of novel form attached to the end of a pole, a gathering hook attached to the frame and a basket or receptacle pivotally connected to such frame so as to occupy a substantially horizontal position during the operation of the implement to insure reception of the fruit therein and to prevent the spilling of the same.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a perspective view of a fruit picker embodying the invention. Fig. 2 is a front view of the device. Fig. 3 is a side view of the parts shown in Fig. 2, the frame being tilted to show the main stay of the basket or receptacle.

Corresponding and like parts are referred to in the following description, and indicated in all the views of the drawing, by the same reference characters.

The device comprises a frame 1 which is approximately of U form, the vertical members being pierced near their upper ends to receive the journals of the basket or receptacle. A tang 2 is located opposite the middle portion of the horizontal member of the frame 1 and is pierced to receive fastenings by means of which the frame is attached to the upper end of a pole 3, which may be of any length or construction. A gathering hook 4 is located at one side of the frame and extends about one side of the basket or receptacle, said gathering hook curving in its length to conform to the outline of the basket and to admit of the latter occupying a substantially horizontal position at all angular positions of the main frame and pole 3. The gathering hook 4 consists of a rod or bar having a hook at its upper end and attached at its lower end to the horizontal member of the frame 1, said bar having a part projecting below the horizontal member of the frame to form the tang 2. The basket or receptacle 5 may be of any construction and is provided at a central point with a main stay 6, which is of substantially U form, the upper ends of the vertical or side members being bent outwardly to form journals 7 which are mounted in the openings at the upper ends of the side members of the frame 1. The main stay 6 may be woven into the basket or receptacle as a part thereof or may be attached thereto in any manner. The main stay 6 consists of a stout wire bent into the shape substantially as shown. The basket is preferably formed of wire, the several elements being bent around the main stay so as to include the same as a part of the basket.

In the operation of the device the gathering hook is engaged over the bough, twig or stem to which the fruit is attached and a pull downward causes the fruit to be snapped or stripped from the limb and to drop into the basket or receptacle, care being exercised to place the implement in such position that the fruit when detached will drop into the basket. By having the basket pivotally connected with the main frame it will practically occupy a horizontal position both when manipulating the device in the tree or when lowering it to deposit the fruit into a receptacle upon the ground or in a wagon.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A fruit gatherer comprising a main frame of substantially U form, a gathering hook having its lower end attached to the horizontal portion of the main frame and pendent therefrom to form a tang for attaching the frame to a pole, and a basket supported between the upright members of the main frame and having the gathering hook at one side thereof.

2. A fruit gatherer comprising a main frame of substantially U form having its side members transversely pierced at their upper ends, a basket, a main stay located centrally of the basket and having the upper ends of its side members bent outwardly to form journals which are mounted in the openings at the upper ends of the side members of the main frame, and a rod secured at a central point to the horizontal member of the main frame and having its lower end pendent to form a tang, said bar curving to one side of the basket and terminating at its upper end in a stripping hook.

In testimony whereof I affix my signature in presence of two witnesses.

LUTHER C. IRVIN.

Witnesses:
J. K. MARSHALL,
S. L. HOGSETT.

---

Copies of this patent may be obtained for five cents each, by addressing the "Commissioner of Patents, Washington, D. C."